June 16, 1942.  D. C. NARTEN  2,286,501
INJECTION CHAMBER HEATING APPARATUS
Filed Jan. 25, 1940   2 Sheets-Sheet 1
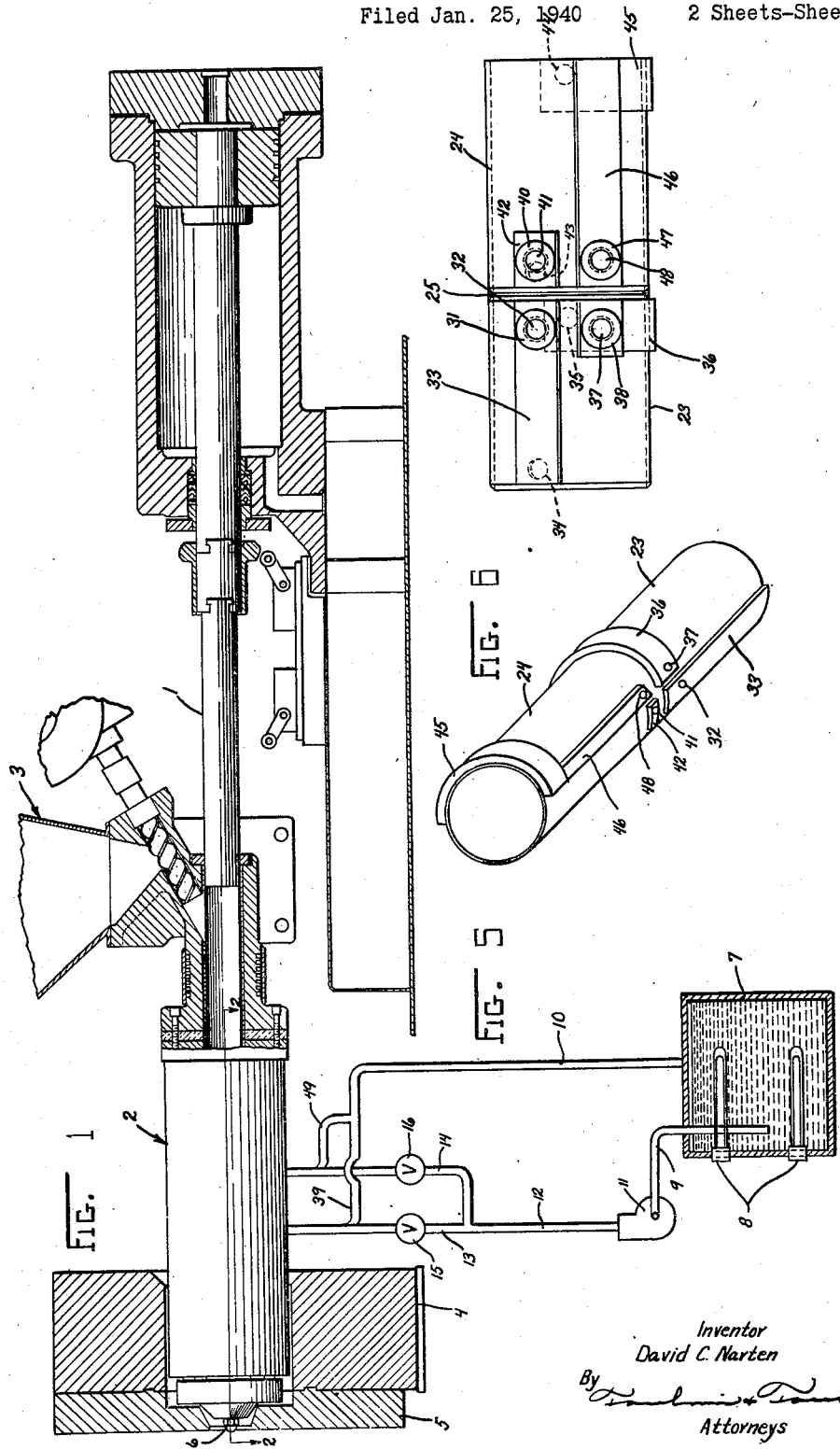
Inventor
David C. Narten
By
Attorneys June 16, 1942.  D. C. NARTEN  2,286,501
INJECTION CHAMBER HEATING APPARATUS
Filed Jan. 25, 1940  2 Sheets-Sheet 2
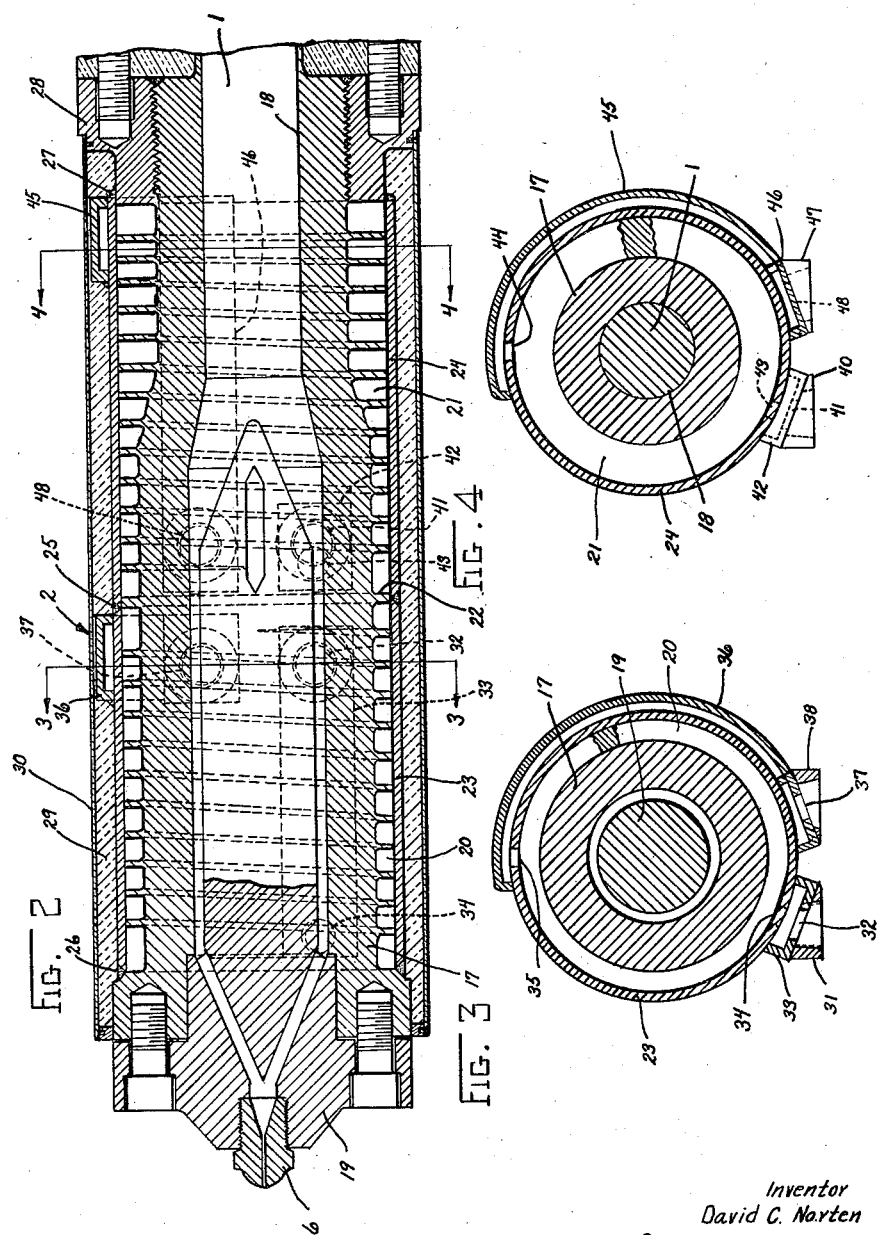
Inventor
David C. Narten
By
Attorneys Patented June 16, 1942

2,286,501

UNITED STATES PATENT OFFICE 2,286,501

INJECTION CHAMBER HEATING APPARATUS

David C. Narten, Mount Gilead, Ohio, assignor to The Hydraulic Development Corp. Inc., Mount Gilead, Ohio, a corporation of Delaware Application January 25, 1940, Serial No. 315,577

9 Claims. (Cl. 18—30)

This invention relates to injection moulding apparatus and more particularly to the means for heating the injection chamber and the plastic therein so as to render it fluent and injectionable. Still more particularly it relates to heating apparatus for the injection or extrusion chamber which comprises a heating jacket surrounding the heating chamber and means for passing a heated liquid such as oil therethrough, provision being made for an improved heating effect and for improved control of the heating.

It is an object of this invention to provide a liquid heating means for the injection or extrusion chamber with which it is insured that the heating chamber is full of liquid at all times and that the partial or complete emptying of the heating jacket is prevented even though the supply of heating liquid to the heating jacket be discontinued; with prior devices when the supply of heating liquid to the heating jacket was discontinued the heating jacket partially or completely emptied through the discharge outlet thus causing uneven heating and causing difficulty in renewing the circulation of the heating liquid; the present invention further avoids the pocketing of air in the heating jacket; it further allows circulation of the heating liquid at any speed however slow, whereas with prior devices it was necessary to supply the heating liquid at at least the rate at which it could drain by gravity out of the heating chamber into the discharge outlet; the present invention therefore completely prevents drainage of heating liquid from the heating jacket.

Another object is to provide a simplified and more compact connection of the liquid heating inlet and outlet conduits, these conduits preferably being brought to a common point which is readily accessible but which is out of the way and does not interfere with the installation or with the appearance of the complete assembly.

Still another object is to provide conduits which are closely adjacent the heating jacket and connect the inlet and outlet passageways to the inlet and outlet ports of the heating jacket even though these ports be at a considerable distance from the inlet and outlet passageways which are disposed at closely adjacent points; these conduits are preferably thin and do not materially increase the diameter of the heating jacket and therefore do not interfere with the neatness, compactness, or appearance of the installation and lend themselves readily to the installation of the injection cylinder in the apparatus and the provision of the usual heat insulating jacket around the heating jacket without unduly increasing the bulkiness of the assembly.

Still another object is to provide a plurality of heating circuits at different portions of the injection cylinder; this allows more accurate control of the temperature to which the plastic is heated; by controlling the flow of heating liquid through the separate circuits different temperatures may be maintained in the different portions of the injection cylinder; it is also possible to discontinue the flow and thereby the heating in one section entirely, or to make use of a plurality of sources of heat, each of these sources being applied to a different heating circuit.

A further object is to provide a heating circuit at each end of the heating chamber, these circuits being individually controlled as by controlling the rate of flow of heating liquid through each of them whereby a considerably lower temperature may be maintained in one of them than in the other; this control of the temperature at the two ends of the heating chamber has been found desirable for certain types of moulding materials.

Still other objects of the invention will more fully hereinafter appear.

In the accompanying drawings—

Fig. 1 is a vertical longitudinal sectional view through an injection moulding machine having its injection cylinder heated in accordance with the principles of the present invention;

Fig. 2 is a horizontal sectional view taken through the injection cylinder on the line 2—2 of Fig. 1;

Fig. 3 is a vertical transverse section through the injection cylinder taken on the line 3—3 of Fig. 2 looking in the direction of the arrows;

Fig. 4 is a similar view taken on the line 4—4 of Fig. 2;

Fig. 5 is a diagrammatic bottom perspective of the jacket which surrounds the spiral heating passageways and which carries the conduits and ports for the entry and discharge of the heating liquid; this view is taken from the rear of this jacket;

Fig. 6 is a bottom plan view of the jacket of Fig. 5.

While the invention will be described with particular reference to its application to injection moulding, it will be understood that the principles thereof are equally applicable in the plastic extrusion art wherein a fluent plastic is extruded through a suitable die to give a continuous article. In the claims the terms "extrusion apparatus" and "extrusion cylinder" are used to comprehend extrusion either in the making of an extruded article in this manner or in the injection moulding of a plastic into a mould.

Referring to the drawings in detail, Fig. 1 portrays the injection moulding apparatus in its entirety. This apparatus need not be described in detail it being sufficient to point out that it comprises the usual injection plunger 1 hydraulically reciprocated within the injection cylinder designated generally as 2 and the construction of which will more fully hereinafter appear. The usual feeding unit designated generally as 3 is provided for feeding granular plastic ahead of the injection plunger 1 for the renewing of the charge in the heating chamber comprised by the injection cylinder 2. The injection cylinder 2 is disposed in the usual manner in a bore therefor in the bolster 4 which carries the plate 5 which is adapted to carry one of the mould halves and which has a central opening through which the injection nozzle 6 of the injection cylinder is adapted to project into engagement with the adjacent mould half carried by plate 5.

The present invention relates particularly to the means for heating the injection cylinder 2. Heating is accomplished by the circulation of a heated liquid such as oil through spiral passageways disposed around the heating chamber of the injection cylinder. The bulk of the oil is carried in a heating tank 7 which is provided with a plurality of electrical heating elements 8 and with the outlet conduit 9 and the return conduit 10. The outlet conduit 9 connects to the circulating pump 11 which pumps the heated oil into a conduit 12 which has the branches 13 and 14 which lead to the heating jacket. Branches 13 and 14 are provided with the manually operable valves 15 and 16 respectively. These valves are adapted to allow the unrestricted passage of oil therethrough, to variably restrict the passage of oil therethrough, or to cut off completely such passage.

The injection cylinder 2 comprises the injection cylinder proper which is designated as 17 and which has the bore 18 for receiving the injection plunger 1. The cylinder 17 forms the heating chamber for the plastic. Disposed within this heating chamber is the torpedo 19, the construction of which is described in detail in the copending application of George M. Geiger, Serial No. 300,456, filed October 20, 1939, differing therefrom only in that the injection nozzle 6 is screw-threadedly received in the forward portion of the torpedo 19 instead of being integral therewith, so as to facilitate replacement or removal for cleaning or the like.

Surrounding the injection cylinder 17 are the spiral heating passageways of which the forward passage is designated as 20 and the rear passageway as 21. The forward passageway extends from the forward end of the heating jacket to a point midway of the length of the heating chamber, while the rear passageway 21 extends from just rearwardly of this point to the rear end of the heating chamber. These passageways are machined in the periphery of the heating cylinder 17, and are separated by the intermediate partition 22 also machined in the injection cylinder 17.

In order to close these passageways steel jackets 23 and 24 are shrunk around the front and rear portions of the injection cylinder 17. These jackets 23 and 24 are separated slightly at their adjoining ends and the space thus formed is filled with the ring of welding 25. At the front end of jacket 23 welding 26 secures it to the injection cylinder 17. Welding 27 similarly joins the rear of jacket 24 to the annular ring 28 which is screw-threadedly received on the rear of cylinder 17.

Surrounding the jackets 23 and 24 is the usual heat insulating jacket 29 of rock-wool or the like which is retained in position by the steel exterior jacket 30.

The branch line 13 supplies the forward heating passageway 20 with heating liquid, this line 15 entering by a nipple 31 (Fig. 3) through a port 32 into the flat longitudinally disposed conduit 33 which is mounted in any suitable manner along the outside of the jacket 23 and which extends therealong inside of exterior jacket 30 to a point located forwardly of the injection cylinder 17. At this forward point the oil enters the forward portion of the spiral passageway 20 by way of a port 34 (shown in dotted lines in Figs. 2 and 3). The oil now circulates rearwardly through the spiral passageway 20 until it is stopped by the partition or baffle 22. The oil now exhausts through the exhaust port 35 (Fig. 3) located in the uppermost portion of jacket 23 at the rear end thereof, passing out of the jacket into the semicircular flat conduit 36 which carries the oil around to the exhaust opening 37 at the bottom of the conduit 36, whence the oil passes outwardly through the nipple 38 to the exhaust pipe 39 which is connected to the return line 10 to the tank 7.

The supply of heating liquid for the rear half of the heating chamber is as follows: the liquid enters through branch line 14 which is connected to an inlet nipple 40, thence through an inlet port 41, thence forwardly for a very slight distance through a conduit 42 to the drilled opening 43 which functions as the inlet port to the spiral passageway 21. The oil then circulates rearwardly through this passageway 21 to the rear end of the chamber where it is exhausted through the opening 44 located at the top of the jacket 24, into the semicircular conduit 45 which communicates at the bottom with the flat longitudinal conduit 46. Conduit 46 leads forwardly to a point closely adjacent the other inlet and exhaust conduits and terminates forwardly in a nipple 47, discharging into this nipple 47 through port 48. Nipple 47 is connected to the exhaust line 49 which is connected to the return line 10 to tank 7.

It will be seen from the foregoing that the inlet and exhaust conduits connect to the injection cylinder in a closely grouped relationship; these connections all being made at a point located at the bottom of the injection cylinder and intermediate the length thereof. It will further be seen that the provision of the flat conduits 33, 36, 45 and 46 which are formed along the wall of the heating jackets themselves makes for a very compact assembly and prevents interference with the provision of the heat insulating jacket 29 therearound or with the assembly of the injection cylinder into the bolster 4 in closely adjacent relationship thereto. It will further be seen that the disposition of the exhaust ports 35 and 44 for the heating passageways is such that the heating passageways are not drained even partially when the supply of heating liquid through the inlet conduits 13 and 14 is discontinued and that consequently the heating chamber is maintained at a uniform temperature and the difficulties attendant upon partial or complete drainage thereof are entirely eliminated. It will further be seen that the arrangement of two heating circuits makes it possible to individually and separately control the temperature at the two ends of the heating chamber. This is accomplished by throttling the flow through one or both of the valves 15 and 16 whereby, if desired, a considerably lower temperature may be maintained in the corresponding section of the heating chamber, or under certain circumstances, heating fluid may be cut off entirely from one section. The arrangement further makes it possible to employ two separate sources of heat although such a modification is not illustrated in the drawings. For example, oil at high temperature might be circulated through the forward heating jacket and oil or other liquid at a lower temperature circulated through the rear heating jacket. If desired the direction of flow of oil in the heating jackets may be reversed so that it flows forwardly around the heating chamber suitable modification being made so that the exhaust ports are located at the top. It is a matter of divergent opinion as to whether the heating liquid should flow forwardly or rearwardly around the injection cylinder, but my invention in its broader aspects contemplates the flow in either direction. It will further be apparent that the present invention maintains the heating passageways full of oil even when the oil is pumped in very slowly which with the previous arrangements would result in partial emptying of the heating passageways, and that even when the control valves 15 and 16 are completely shut off the heating passageways remain full of heating liquid. As pointed out above the connection of the inlet and outlet pipes 13, 14, 39 and 49 in grouped relationship at a conveniently accessible point and the use of built-in conduits or channels leading from these pipes to the appropriate inlet or exhaust ports of the heating jackets is very advantageous in the provision of a neat and trouble-free unit.

It will be seen that if the exhaust ports 35 and 44 were located at the bottom of the heating jackets instead of at the position contemplated by the present invention where they are substantially at the highest point of the heating passageways, complete drainage of the last half turn of the spirals would occur and the level of the liquid in the other turns of the spirals would lower until the upper surface of the injection cylinder proper 17 between the separating ribs was exposed.

While the invention is described as applied to a horizontal injection cylinder, the principle of taking off the discharged heating liquid by an exhaust port located at the highest point of the passageway may obviously be applied to injection cylinders disposed vertically or at any angle.

While the invention has been described with particular reference to one embodiment thereof, it is to be understood that it is not to be limited to this embodiment but that modifications may be made therein to adapt the invention to varying conditions and uses, and that the invention is to be limited only as defined in the appended claims.

Having thus fully described my invention what I claim as new and desire to secure by Letters Patent is:

1. Extrusion apparatus comprising an extrusion cylinder, means forming a liquid heating passageway around said cylinder, an inlet port for said passageway in a lower portion of said means, an outlet port from said passageway in an upper portion of said means, conduit means terminating adjacent said means at a point removed from said ports, conduits for connecting the termination of said conduit means to said ports, said conduits forming thin, flat channels disposed substantially transverse with respect to each other and arranged closely adjacent the outer face of said passageway-forming means, heating fluid supply means connected with said conduit means, and controlling means associated with said conduit means and adapted substantially to prevent escape of heating fluid from said inlet port to said fluid supply means in case of failure of the latter.

2. Extrusion apparatus comprising an extrusion cylinder, means forming a liquid heating passageway around said cylinder, ports provided in the bottom and the top of said means and directly communicating with said passageway, conduit means terminating adjacent said means at the bottom thereof in transverse alignment with one of said ports, conduits for connecting the termination of said conduit means to said ports, said conduit forming thin, flat channels disposed on the outside of said passageway-forming means closely adjacent the outer face thereof and extending in a plane substantially parallel to said outer face, and means substantially flush with said channels forming conduits and surrounding said passageway-forming means.

3. Extrusion apparatus comprising an extrusion cylinder, means therearound including an outer cylindrical jacket forming a liquid heating passageway therearound, spaced ports respectively arranged in an upper and lower portion of said jacket and leading directly inwardly to said passageway, conduit means terminating adjacent said jacket at a point removed from said ports, and conduits for connecting the termination of said conduit means to said ports, said conduits forming thin, flat channels disposed closely adjacent the outer face of said jacket and extending in a plane substantially parallel to said face, said jacket forming the inner wall of said conduits and the outer wall of said passageway.

4. Extrusion apparatus comprising an extrusion cylinder, means therearound forming a spiral liquid heating passageway therearound and longitudinally thereof, a port at a lower portion in the outer face of said means leading directly inwardly to one end of said spiral passageway, conduit means terminating adjacent said means at a point removed from said port, a conduit substantially parallel to the axis of said chamber for connecting the termination of said conduit means to said port, said conduit forming a thin flat channel disposed closely adjacent the outer face of said passageway-forming means, a second port provided in an upper portion of said passageway and axially spaced from said first port, and semicircular conduit means adapted to be connected with an exhaust and communicating with said second port.

5. Extrusion apparatus comprising a horizontal extrusion cylinder, means forming a spiral liquid heating passageway therearound and longitudinally thereof, a port in said means adjacent the bottom thereof and leading directly inwardly to one end of said passageway, conduit means terminating adjacent said means at a point removed from said port and in longitudinal alignment therewith, a thin, flat conduit connecting said conduit means to said port and disposed closely adjacent the outer face of said passageway-forming means with its plane of flatness substantially parallel to said outer face, a port in the top of said passageway-forming means leading directly inwardly to the other end of said passageway, a second conduit means terminating adjacent said first-named conduit means and in transverse alignment with said port, and a thin, flat curved conduit connecting said second conduit means to said second-named port and disposed closely adjacent the outer face of said passageway-forming means with its plane of flatness substantially parallel to said outer face.

6. Extrusion apparatus comprising a horizontal extrusion cylinder, means forming a plurality of extended liquid heating passageways therearound having their ends spaced longitudinally thereof, a pair of conduits for each of said passageways terminating in a group adjacent said means, a port in said means at each end of each of said passageways, one of said ports for each of said passageways being disposed at the top of said means and of said cylinder, and thin, flat conduits disposed parallel to and closely adjacent said means and connecting each of said ports with one of said conduits.

7. Extrusion apparatus comprising a horizontal extrusion cylinder, means forming an extended liquid passageway therearound having its ends spaced longitudinally thereof, a pair of conduits terminating in grouped relationship adjacent said means, a port in said means at each end of said passageway, at least one of said ports being disposed at the top of said means, and thin, flat conduits disposed closely adjacent and with their width parallel to said means for connecting each of said ports to said conduits.

8. An extrusion apparatus comprising in combination, an extrusion cylinder, a spiral shaped passageway therearound forming a heating chamber, heat insulation means surrounding said heating chamber, a flat, semi-circular channel shaped conduit arranged adjacent said passageway and in said insulating means so as to extend from an upper portion of said passageway to a lower portion thereof, said conduit having its upper portion in communication with an outlet port in the upper portion of said passageway at one end thereof and having its lower portion adapted to be connected with an exhaust, and a flat longitudinal conduit having one end in continuous communication with an inlet opening in said passageway at the other end thereof, and having its other end arranged adjacent said semi-circular channel and adapted to be connected with the delivery side of a fluid source for delivering heating liquid, and delivery and exhaust connecting conduits from delivery and to exhaust sources connected with said semi-circular and longitudinal conduits and located in close relationship.

9. An extrusion apparatus comprising in combination, an extrusion cylinder, two independent spiral shaped passageways around different portions of said cylinder, each of said passageways having an inlet opening at a lower portion of said passageways and an outlet opening at an upper portion of said passageways, each inlet opening being spaced along the axis of said cylinder from its corresponding outlet opening, two flat semi-circular channel shaped conduits respectively communicating with the outlet openings and leading to an exhaust port at the bottom of said channels, and a pair of longitudinally arranged flat channel shaped conduits arranged substantially traverse to said semi-circular shaped channels and respectively effecting communication between said inlet openings and inlet ports in immediate proximity of said exhaust ports, the inlet and exhaust conduits leading from the pairs of longitudinally arranged conduits and the two semi-circular channel-shaped conduits all being positioned in close proximity at the lower portion of said extrusion cylinder.

DAVID C. NARTEN.